United States Patent [19]

Venable

[11] Patent Number: 4,649,769
[45] Date of Patent: Mar. 17, 1987

[54] TILT-TELESCOPE STEERING COLUMN

[75] Inventor: Frederick D. Venable, Lafayette, Ind.

[73] Assignee: TRW Inc., Lyndhurst, Ohio

[21] Appl. No.: 813,715

[22] Filed: Dec. 27, 1985

[51] Int. Cl.$^4$ .......................... B62D 1/18; G05G 5/06
[52] U.S. Cl. .................................. 74/493; 74/471 R; 74/526; 74/527; 74/533; 403/105; 403/324
[58] Field of Search ..................... 74/493, 526, 471 R, 74/533, 538, 527; 280/775; 403/324, 105, 93, 116, 117

[56] References Cited

U.S. PATENT DOCUMENTS

| | | |
|---|---|---|
| 2,903,904 | 9/1959 | Mackie . |
| 2,991,662 | 7/1961 | Werner ........................... 74/526 X |
| 3,245,282 | 4/1966 | Kimberlin . |
| 3,302,478 | 2/1967 | Pauwels . |
| 3,342,080 | 9/1967 | Cantleberry . |
| 3,386,309 | 6/1968 | Reed et al. . |
| 4,018,101 | 4/1977 | Mihalic . |
| 4,530,254 | 7/1985 | Toyoda et al. .................. 74/493 |
| 4,561,796 | 12/1985 | Hanaoka ........................ 403/116 X |

Primary Examiner—Rodney H. Bonck
Attorney, Agent, or Firm—Tarolli, Sundheim & Covell

[57] ABSTRACT

A steering column comprises a pair of steering column members. One of the steering column members is movable axially relative to the other. Structure is also provided for supporting the pair of steering column members for tilting movement about a tilt axis which extends transverse to the direction of relative axial movement of the steering column members. A first locking device locks the steering column members in any one of a plurality of relative axial positions, and a second locking device locks the steering column members in any one of a plurality of tilt positions. A control lever is movable to release the first and second locking devices. A linkage is connected with the control lever and the first and second locking devices to release the first and second locking devices upon movement of the control lever.

13 Claims, 7 Drawing Figures

TILT-TELESCOPE STEERING COLUMN

BACKGROUND AND SUMMARY OF THE INVENTION

The present invention relates to an adjustable steering column for a vehicle, and particularly to a steering column which is axially and angularly adjustable.

Steering columns which are axially and angularly adjustable are well known. Typically, an axially and angularly adjustable steering column includes a pair of steering column members which telescope to effect the axial adjustment and pivot about a tilt axis to effect the angular adjustment. Also, the known steering columns include a pair of lock mechanisms for respectively locking the steering column members in one of a plurality of telescoped positions and in one of a plurality of tilt positions. A control lever mounted on the steering column is moved to release the locking mechanisms to enable the steering column members to be tilted and telescoped.

The present invention is directed to a steering column which includes a pair of telescoping steering column members supported for tilting movement about a tilt axis. A first locking mechanism locks the telescoping steering column members in one of a plurality of telescoped positions and a second locking mechanism locks the steering column members in one of a plurality of tilt positions. A control lever is movable to release the first and second locking mechanisms.

The control lever is connected to the first and second locking mechanisms by a simple linkage. The linkage includes a first pivotally mounted link which is connected with the control lever. Upon movement of the control lever, the first link pivots to release the first locking mechanism to enable the steering column members to telescope. A second link is pivotally attached to the first link and is also pivotally attached to the second locking mechanism. Movement of the control lever effects movement of the second link. Movement of the second link results in release of the second locking mechanism to enable the steering column to tilt. Thus, the present invention includes a simple two-link system for effecting release of both the tilt and telescoping locking mechanisms.

Further in accordance with the present invention, an extremely simple stop mechanism is provided to limit the amount of tilting movement of the steering column. Thus, the tilt requirements of various vehicle manufacturers can be easily met. The stop is mounted on a fixed part of the vehicle. The stop has a portion located in a slot in a part which tilts when the steering column tilts. When a surface, which defines an end of the slot, engages the stop further tilting of the steering column is prevented. The stop is removably mounted and can be replaced by a different sized stop. The surfaces, which define the ends of the slot, will engage the different sized stop after a different amount of pivoting of the steering column members. Thus, the amount of pivoting movement of the steering column can be varied.

BRIEF DESCRIPTION OF THE DRAWINGS

Further features and advantages of the present invention will be apparent to those skilled in the art to which the invention relates from a reading of the following specification made with reference to the accompanying drawings, in which:

FIG. 6 is a view taken approximately along line 6—6 of FIG. 1; and

FIG. 7 is a view taken approximately along line 7—7 of FIG. 3 with parts removed.

DETAILED DESCRIPTION

Figure 1:
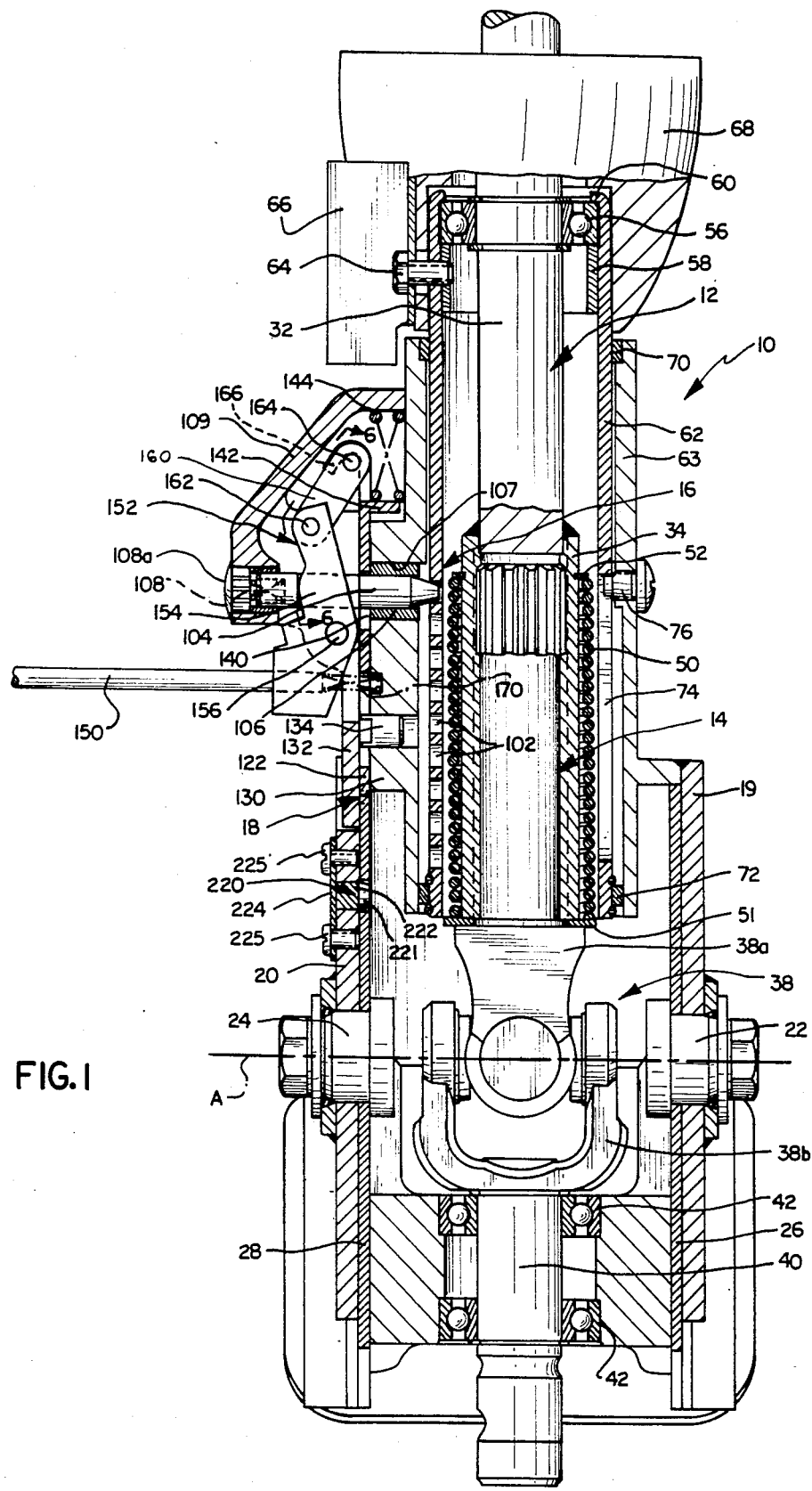
FIG. 1 is a sectional view of a steering column embodying the present invention.

The present invention comprises an axially and angularly adjustable vehicle steering column 10 (FIG. 1). The steering column 10 includes a pair of steering column members 12, 14. The vehicle steering wheel (not shown) is attached to steering column member 12. Steering column member 12 rotates upon rotation of the vehicle steering wheel. The steering column members 12, 14 telescope to effect axial adjustment of the steering column and pivot about a tilt axis A to effect angular adjustment of the steering column 10. A releasable lock mechanism 16 locks the steering column members 12, 14 in one of a plurality of telescoped positions. A releasable tilt locking mechanism 18 locks the steering column members 12, 14 in one of a plurality of tilt positions.

The steering column member 12 includes an upper shaft part 32 to which the steering wheel is attached. The shaft part 32 is connected to a lower tubular steering shaft part 34, such as by welding. The tubular shaft part 34 has internal splines thereon which mesh with external splines on the steering column member 14.

The steering column member 14 is connected to a yoke 38a of a universal joint 38. Another yoke 38b of the universal joint 38 is connected to an output shaft 40, which is attached to the steering gear (not shown) of the vehicle. The output shaft 40 is journalled in bearings 42 which are supported by plates 26 and 28. The plates 26 and 28 are suitably fixed in the vehicle. The universal joint 38 has a pivot axis about which the steering column members 12, 14 may pivot and which is coaxial with the tilt axis A. From the above, it should be clear that upon rotation of the steering wheel the steering column members 12, 14 rotate and the rotational movement is transmitted to the output shaft 40 to effect vehicle steering.

The steering column members 12, 14 may be moved axially (telescoped) relative to each other. One end of a spring 50 acts against a snap ring 52 carried by steering column member 12 to bias the steering column member 12 vertically (as viewed in FIG. 1) relative to steering column member 14. The other end of the spring 50 rests on a snap ring 51 connected with the yoke 38a of the universal joint 38.

The upper shaft part 32 is journalled in a bearing 56. The inner race of bearing 56 is located between snap rings carried on the shaft part 32. The outer race of bearing 56 is supported between a collar 58 and an overturned upper end portion 60 of a tubular part 62. The tubular part 62 extends coaxially of the steering column member 12. The collar 58 is secured to the tubular member 62 by a suitable fastener 64. Thus, the tubular member 62 is fixed to the shaft part 32 and moves axially with the steering column member 12. The fastener 64 also secures the vehicle's turn signal support bracket 66 and the shroud 68 in position. The shroud 68 covers the upper end of the steering column.

On axial movement of the steering column member 12, the tubular member 62 telescopes relative to a tubular member 63 which encircles the tubular member 62. Upper and lower bearing members 70, 72 are interposed between the tubular members 62, 63 to guide the relative telescoping movement of these members. The lower bearing member 72 is trapped between snap rings on the tubular member 62, and thus moves with the tubular member 62. The upper bearing member 70 is suitably secured to the tubular member 63.

A slot 74 is provided in the tubular member 62. A pin 76 is threaded into the tubular member 63 and has a portion which extends into the slot 74. The pin 76 snugly fits in the slot 74 and prevents the tubular member 62 from rotating about its axis relative to the tubular member 63.

The lower end of the tubular member 63 is welded to a pair of spaced apart side plate members 19, 20. The side plate members 19, 20 are pivotally connected to the fixed plates 26, 28 by pivot pins 22 and 24, respectively. The axes of the pivot pins 22, 24 are coaxial with the tilt axis A.

Figure 2:
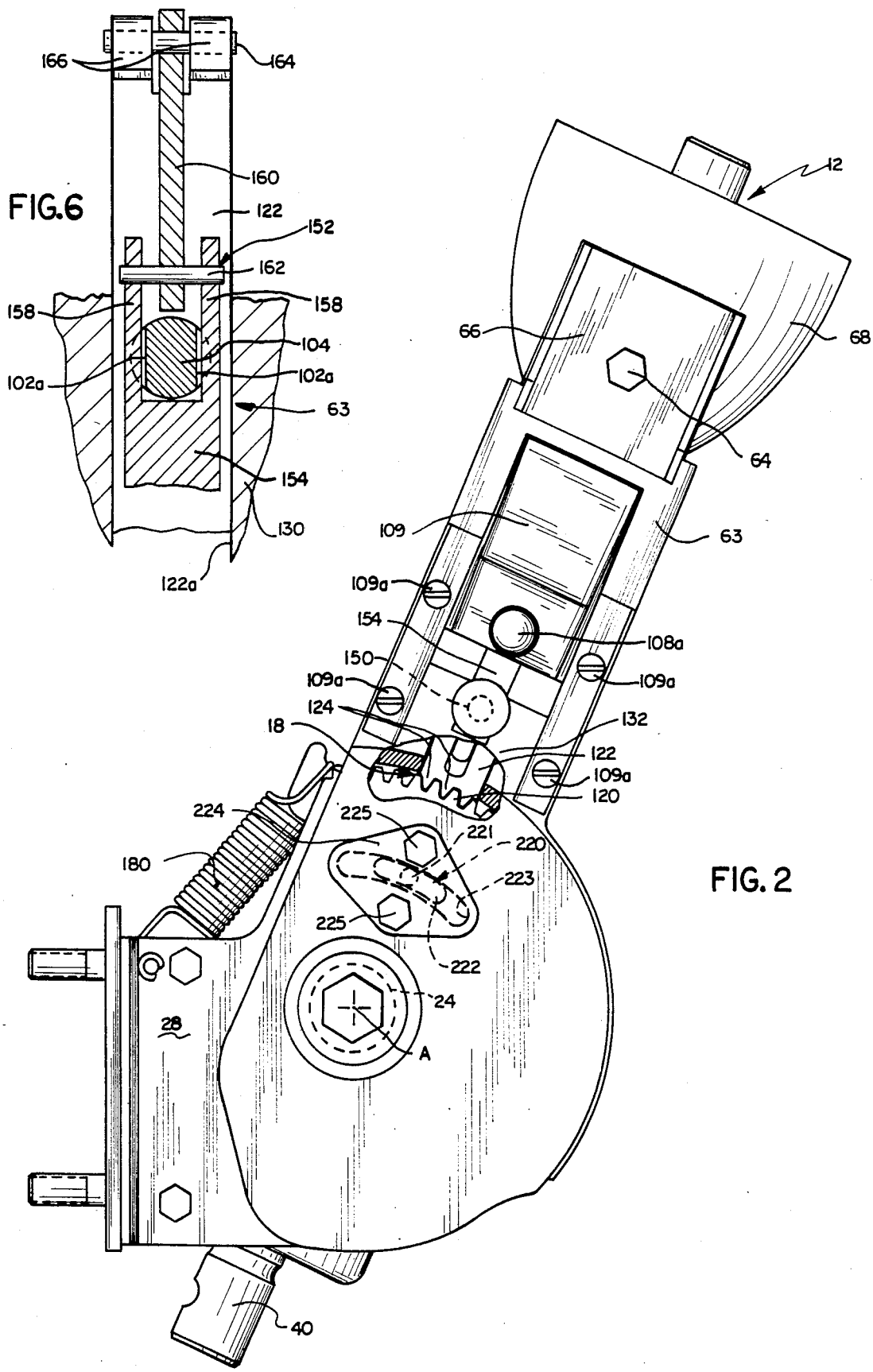
FIG. 2 is a partially fragmented side elevational view of the steering column of FIG. 1 looking at the steering column of FIG. 1 from the left.

The locking mechanism 16 for locking the steering column members 12, 14 in any one of a plurality of telescoped positions includes the tubular member 62. The tubular member 62 has a plurality of spaced openings designated 102 in the left periphery thereof as viewed in FIG. 1. A locking pin 104 is carried in a bearing 106 supported in an opening 107 in the tubular member 63. A spring 108 biases the locking pin 104 into an opening 102. The spring 108 acts between a cap 108a carried by a housing 109 and the pin 104. The outermost end of the pin 104 is supported in a bearing supported in the housing 109. The housing 109 is secured to the member 63 by fasteners 109a (FIG. 2). When the pin 104 (FIG. 1) is in an opening 102, the steering column members 12, 14 cannot telescope. If the pin 104 is out of an opening 102, the steering column members 12, 14 may telescope to thereby axially adjust the steering column 10.

Figures 4, 5:
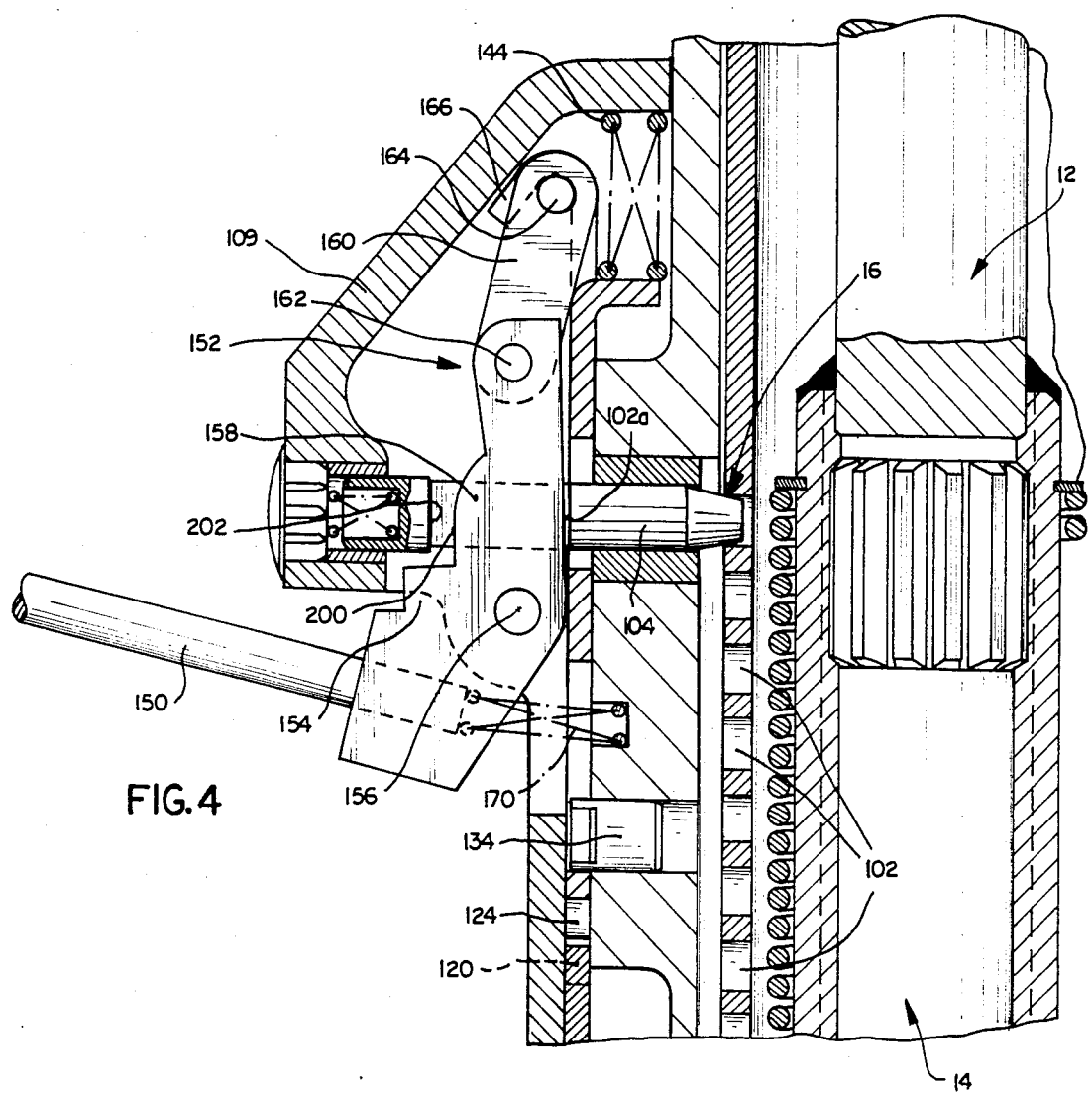
FIG. 4 is a view similar to FIG. 3 showing the parts in still another position.
FIG. 5 is a fragmentary view of a portion of the steering column as shown in FIG. 2 showing parts in another position.

The mechanism 18 for locking the steering column members 12, 14 in a desired tilt position includes a toothed portion 120 of the fixed side plate 28 (see FIGS. 2 and 5). A movable tilt locking member 122 has teeth 124 which mesh with the toothed portion 120 of the side plate 28. The tilt locking member 122 is slidable in a vertical slot 122a (FIG. 6) in the portion 130 of the member 63 and is held in the slot 122a by a portion 132 (FIG. 2) of the housing 109. A pin 134 (FIG. 1) is supported in the portion 130 of the member 63 and is snugly received in a slot in the tilt locking member 122 to guide movement of the tilt locking member 122 in the slot 122a.

The tilt locking member 122 also has an opening 140 through which the locking pin 104 extends. The opening 140 is sized such that the locking pin 104 does not interfere with the sliding movement of the tilt locking member 122, nor does the sliding movement of the tilt locking member 122 interfere with movement of the locking pin 104.

The upper end of the tilt locking member 122 has a flange 142 which extends radially inwardly of the steering column 10. A spring 144 acts between the housing 109 and the flange 142 to bias the tilt locking member 122 downwardly so that the teeth of the tilt locking member 122 mesh with the toothed portion 120 of the side plate 28. When the teeth are engaged, the steering column members cannot pivot about tilt axis A. When the member 122 moves away from the toothed portion 120 of the plate 28 and the teeth are disengaged, the steering column 10 may be pivoted or tilted about the tilt axis A.

The locking mechanisms 16, 18 are released upon movement of a control lever 150 from its position shown in FIG. 1. Specifically, the control lever 150 may be moved to effect movement of the locking pin 104 from an opening 102 in the tubular member 62 to enable the steering column members 12, 14 to be telescoped. Also, the lever 150 may be moved to effect movement of the tilt locking part 122 away from member 28 to thereby enable the steering column members 12, 14 to be tilted.

The control lever 150 is connected with the locking pin 104 and with the tilt locking part 122 by a linkage designated 152. The linkage 152 includes a first link 154 to which the lever 150 is fixedly attached, such as by a threaded connection. The first link 154 is pivotally attached by a pivot pin 156 to the housing 109. The first link 154 has two portions 158 (see FIG. 6) which extend from the pivot pin 156 and through slots 102a in the locking pin 104. The upper ends of the portions 158 are pivotally connected to a second link 160. The second link 160 is pivotally attached to the first link 154 by a pivot pin 162 fixed to link 160 and journalled in portions 158. The upper end of the link 160 fixedly carries a pin 164 which projects beyond both sides of the link 160. Hook portions 166 of the tilt lock member 122 extend around the projecting portions of the pin 164. The pin 164 and the hook portions 166 can pivot relative to each other, and can bodily move relative to each other. As seen in FIG. 1, the links 154 and 160 extend at an angle to each other when the lever 150 is in the position shown in FIG. 1, and the pivot pin 162 lies on one side of a line extending between the center of pins 156 and 164.

A spring 170 acts between the tubular member 63 and the first link 154. The spring 170 biases the control lever 150 to the position shown in FIG. 1. The spring 170 also biases the linkage 152 so that the pin 164 is seated in the hook portions 166 of the tilt locking part 122, when the parts are in the position shown in FIG. 1. The spring 170 is of a lower rate than spring 144 and cannot move pin 164 and the tilt locking member 122 against the bias of spring 144.

Figure 3:
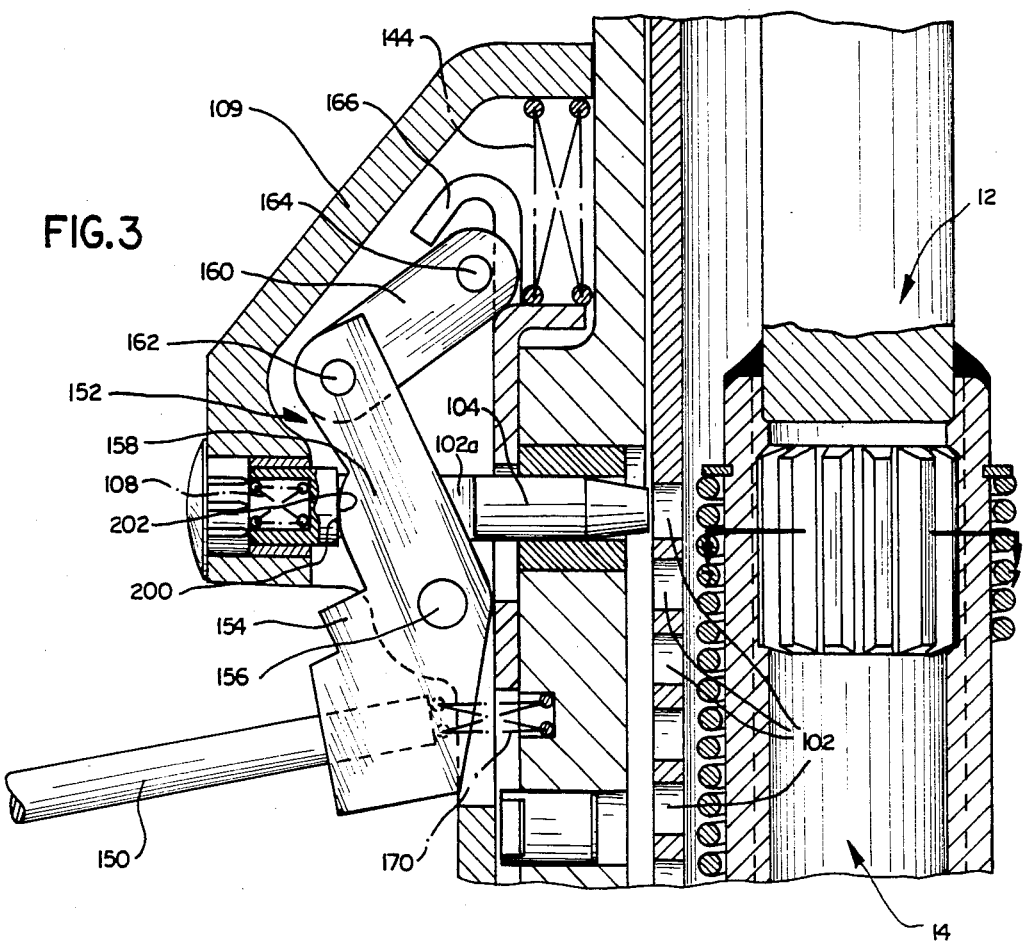
FIG. 3 is an enlarged fragmentary sectional view of a portion of the steering column of FIG. 1 showing parts in a different position.

As shown in FIG. 1, the steering column members 12, 14 are located in a position in which they are totally collapsed together. To extend the steering column members 12, 14 from the position shown in FIG. 1, the control lever 150 is moved downwardly from the position shown in FIG. 1 to the position shown in FIG. 3. When the control lever 150 is moved to the position shown in FIG. 3, the link 154 pivots about the axis of pivot pin 156 in a counterclockwise direction as viewed in FIG. 3, and surfaces 200 of the portions 158 of the first link 154 engage surfaces 202 on the locking pin 104 and force the locking pin out of an opening 102 in the tubular member 62. The spring 50, which biases the steering column member 12 outwardly relative to the steering column member 14 then assists the operator in extending the steering column 10.

When the steering column member 12 is moved to the desired position, the control lever 150 may be released and the spring 108 biases the pin 104 into engagement with an opening 102 in the tubular member 62. This locks the steering column members 12, 14 in a new position. Any other movement of the control lever 150 in a downward direction will again move the locking pin 104 from an opening 102, and the steering column members 12, 14 may be moved to a new position.

To tilt the steering column members 12, 14 about the tilt axis A, the lever 150 is moved upwardly from the position shown in FIG. 1 to the position shown in FIG. 4. Upward movement of the lever 150 causes the first link 154 to pivot in a clockwise direction about the axis of pin 156 as shown in FIG. 4. Clockwise movement of the first link 154 results in clockwise movement of the pivot pin 162. Clockwise movement of the pivot pin 162 tends to straighten out the links 154 and 160 and causes the pivot pin 164 to move away from the pin 156. The pin 164 thus lifts the tilt locking member 122 away from the toothed portion 120 of side plate 28 to the release position illustrated in FIG. 5. When this occurs, a pair of springs 180 (one of which is shown in FIG. 2) assist the vehicle operator in moving the steering column members 12, 14 to a desired tilt position about tilt axis A.

After the steering column members 12, 14 are moved to the desired tilt position, the lever 150 is released. The spring 144 biases the tilt locking member 122 to move into a position where the teeth thereof engage the toothed portion 120 of side plate 28 to lock the steering column members 12, 14 from movement about the tilt axis A. Also, the springs 144 and 170 return the linkage 152 and control lever 150 to the positions shown in FIG. 1.

From the above it should be clear that a very simple linkage 152 interconnects the control lever 150 with the tilt lock member 122 and the locking pin 104. The linkage 152 comprises merely of a pair of links 154, 160 which effect unlocking of the locking mechanisms 16 and 18 in response to movement of a single control lever 150.

It should further be clear that movement of the lever 150 in an upward direction releases the tilt locking member 122 and movement of the lever 150 in a downward direction releases the locking pin 104. By merely a simple change in the location of the pivot pin 156 and of the connection of the control lever 150 to the first link 154, both lock mechanisms 16, 18 could be released simultaneously. If the pivot pin 156 was located above the locking pin 104 and the control lever 150 was located above the pin 156, upward movement of the lever 150 would cause the lever 154 to pivot in a clockwise direction about the pivot 156. The pin 104 would be moved outwardly to a release position simultaneously with vertical movement of the pin 164. Thus, the tilt locking member 122 and the locking pin 104 would move to their release positions simultaneously, and the tilt and telescoping action of the steering column members 12, 14 could occur simultaneously.

Further in accordance with the present invention, the steering column 10 has a stop 220 (FIGS. 1 and 2) which limits the amount of tilting movement of the steering column members 12, 14. The stop 220 has a portion 221 which is snugly located in an opening in the fixed side plate 28. Thus, the stop 220 cannot move relative to side plate 28. The stop 220 also has a portion 222 which is located in a slot 223 in the plate 20.

The slot 223 is curved about the tilt axis A. Also, the portion 222 of the stop located in the slot is curved about the tilt axis A. The surface of the plate 20 defining the ends of the slot 223 upon pivotal movement of the steering column members 12, 14 will engage the ends of the portion 222 of the stop member 220. Thus, the stop 220 will limit the amount of tilting movement of the members 12, 14. A removable cover 224 encloses the stop 220 and holds the stop in position in the slot 223. The cover 224 is secured to the plate 20 by suitable screw fasteners 225.

If the stop 220 was removed and a stop having a different size for portion 222 was positioned in the steering column, the amount of pivoting movement of the steering column members would change. Also, by removing the stop 220 from the slot 223, the steering column can pivot to an extreme position so as not to interfere with certain repairs to the vehicle.

Also, the steering column 10 includes a mechanism for providing a vehicle operator with a feeling of tightness in the steering mechanism. As shown in FIG. 7, the steering column member 14 has a passage 230 extending diametrically through the steering column member 14. A spring 231 and a pair of balls 232, 233 are located in the passage 230. The spring 231 biases the balls 232, 233 radially outwardly of the passage 230. The balls 232, 233 engage flank surfaces of splines on the internal diameter of the steering column member 34. Upon rotation of the steering shaft 34 in either direction as viewed in FIG. 7, the balls 232, 233 may move radially against the bias of the spring 231 to offset the effect of clearance between the external spline on column member 14 and the internal spline on column member 12. Therefore, the operator will not feel any rotational clearance between the steering column members 12, 14 in the steering column 10.

Having described a specific preferred embodiment of the invention, I claim:

1. A steering column comprising:
    a pair of coaxial steering column members, one of said steering column members being movable axially relative to the other;
    means supporting said pair of steering column members for tilting movement about a tilt axis extending transverse to the direction of relative axial movement of said steering column members;
    first locking means for locking said steering column members in any one of a plurality of relative axial positions;
    second locking means for locking said steering column members in any one of a plurality of tilt positions;
    a control lever movable to release said first and second locking means;
    a linkage connected with said control lever and said first and second locking means to release said first and second locking means upon movement of said control lever;
    said linkage including a first link connected with said control lever and pivotally mounted for movement about a first axis to release said first locking means upon movement of said control lever, and a second link pivotally attached to said first link and attached to said second locking means to release said second locking means on pivotal movement of said first link about said first axis.

2. A steering column as defined in claim 1 wherein said first locking means comprises a locking pin and a locking member having a plurality of openings each of which may receive said pin; means for supporting said locking member for axial movement with said one steering column member relative to said other steering column member; means for supporting said locking pin in a fixed position relative to said other steering column member; and biasing means for applying a biasing force to said locking pin urging said locking pin into one of said openings.

3. A steering column as defined in claim 2 wherein said second locking means comprises a pair of tilt locking members which have portions engageable to lock said first and second tilt locking members together; means for mounting one of said tilt locking members for tilting movement with said pair of steering column members; means for fixing the other of said tilt locking members from tilting movement with said pair of steering column members; and spring means biasing said one tilt locking member relative to the other tilt locking member to cause said portions to engage to lock said first and second tilt locking members together.

4. A steering column as defined in claim 3 wherein said first link has a portion which engages said locking pin on pivotal movement of said first link to pull said locking pin against said biasing force from the opening in said locking member in which it is located.

5. A steering column as defined in claim 4 wherein said one tilt locking member has an opening through which said locking pin extends.

6. A steering column as defined in claim 4 wherein said second link is pivotally attached to said one tilt locking member and moves said one tilt locking member relative to the other tilt locking member upon pivotal movement of said first link.

7. A steering column as defined in claim 6 wherein said first axis is located beneath said locking pin and said pivotal connection of said second link to said first link is located above said locking pin and said first link extends through a slot in said locking pin.

8. A steering column as defined in claim 6 wherein said first and second links extend at an angle to each other when said first and second locking means are engaged, and the pivotal attachment of said first link to said second link lies to one side of a line extending between the pivot axis of said first link and the pivotal connection of said second link to said one tilt locking member.

9. A steering column as defined in claim 8 wherein said tilt locking member has an opening through which said locking pin extends.

10. A steering column comprising:
a pair of coaxial steering column members;
means supporting said steering column members for tilting movement about a tilt axis;
a part movable about said tilt axis with said steering column members, said part having a slot therein which is curved about said tilt axis;
a fixed stop having a portion located in said slot, the space between the ends of said slot and the ends of said stop defining the amount of tilting movement of said steering column members about said axis, whereby changing the configuration of said stop results in a change in the amount of pivoting of said steering column members about said axis;
means for removably mounting said stop in said slot;
one of said steering column members being movable axially relative to the other, said steering column further including first means for locking said steering column members in any one of a plurality of relative axial positions;
second means for locking said steering column members in any one of a plurality of tilt positions;
a control lever movable to release said first and second locking means;
a linkage connected with said control lever and said first and second locking means to release said first and second locking means upon movement of said control lever;
said linkage including a first link connected with said control lever and pivotally mounted for movement about a first axis to release said first locking means upon movement of said control lever, and a second link pivotally attached to said first link and attached to said second locking means to release said second locking means on pivotal movement of said first link about said first axis.

11. A steering column as defined in claim 10 wherein said portion of said stop in said slot is arcuate, and said means supporting said steering column members for tilting movement comprises a plate member having an opening, said stop having a portion extending into said opening.

12. A steering column as defined in claim 10 wherein said first locking means comprises a locking pin and a locking member having a plurality of openings each of which may receive said pin; means for supporting said locking member for axial movement with said one steering column member relative to said other steering column member; means for supporting said locking pin in a fixed position relative to said other steering column member; and biasing means for applying a biasing force to said pin urging said pin into one of said openings.

13. A steering column as defined in claim 12 wherein said second locking means comprises a pair of tilt locking members which have portions engageable to lock said first and second tilt locking members together; means for mounting one of said tilt locking members for tilting movement with said pair of steering column members; means for fixing the other of said tilt locking members from tilting movement with said pair of steering column members; and spring means biasing said one tilt locking member relative to the other tilt locking member to cause said portions to engage to lock said first and second tilt locking members together.

* * * * *